(12) United States Patent
Ng et al.

(10) Patent No.: US 10,013,475 B2
(45) Date of Patent: *Jul. 3, 2018

(54) METHOD FOR REBALANCING DATA PARTITIONS

(71) Applicant: International Business Machines Corporation, Armonk, NY (US)

(72) Inventors: Ka Chun Ng, San Jose, CA (US); Haakon Roberts, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,616

(22) Filed: Jul. 24, 2017

(65) Prior Publication Data

US 2017/0316077 A1 Nov. 2, 2017

Related U.S. Application Data

(63) Continuation of application No. 14/261,044, filed on Apr. 24, 2014.

(51) Int. Cl.
*G06F 17/30* (2006.01)
(52) U.S. Cl.
CPC .. *G06F 17/30584* (2013.01); *G06F 17/30598* (2013.01)
(58) Field of Classification Search
None
See application file for complete search history.

(56) References Cited

U.S. PATENT DOCUMENTS

| | | | |
|---|---|---|---|
| 5,237,678 A | 8/1993 | Kuechler et al. |
| 6,125,370 A | 9/2000 | Courter et al. |
| 6,269,375 B1 | 7/2001 | Ruddy et al. |
| 6,415,375 B2 | 7/2002 | Tamotsu |
| 7,970,756 B2 | 6/2011 | Beavin et al. |
| 8,364,677 B2 | 1/2013 | Brodfuehrer et al. |
| 8,447,791 B1 | 5/2013 | Patriquin |
| 8,543,538 B2 | 9/2013 | Frantz et al. |
| 9,177,004 B2 | 11/2015 | Bright |
| 9,405,817 B2 | 8/2016 | Ng et al. |

(Continued)

OTHER PUBLICATIONS

Pavlo et al., "Skew-Aware Automatic Database Partitioning in Shared-Nothing, Parallel OLTP Systems", pp. 61-72, SIGMOD'12, May 20-24, 2012, Scottsdale, Arizona, USA, Copyright 2012 ACM.

(Continued)

*Primary Examiner* — Amresh Singh
(74) *Attorney, Agent, or Firm* — Isaac J. Gooshaw

(57) ABSTRACT

Embodiments of the present invention disclose a computer program product for rebalancing partitioned data based, at least in part, on limit key extrapolation in a database and one or more characteristics of the plurality of database partitions. Responsive to a determination that an upper limit key value of the last loaded record is greater than an upper limit key value of an empty partition, the computer redefines the upper limit key value of the empty partition using an extrapolated upper limit key value that is based, at least in part, on a range of limit key values. The computer updates one or more characteristics of the database, wherein the one or more characteristics include one or both of a) an average number of records per partition, and b) an average number of unique limit key values per partition.

1 Claim, 5 Drawing Sheets

(56) References Cited

U.S. PATENT DOCUMENTS

| | | |
|---|---|---|
| 2011/0125745 A1 | 5/2011 | Bright |
| 2012/0136835 A1 | 5/2012 | Kosuru et al. |
| 2012/0143873 A1 | 6/2012 | Saadat |
| 2013/0080473 A1 | 3/2013 | Kuno et al. |
| 2013/0132397 A1 | 5/2013 | MacMillan et al. |
| 2013/0166606 A1 | 6/2013 | Fricke et al. |
| 2015/0149509 A1 | 5/2015 | Leu et al. |
| 2015/0309999 A1 | 10/2015 | Ng et al. |
| 2017/0039262 A1 | 2/2017 | Ng et al. |

OTHER PUBLICATIONS

"Method and System for Creating a Variable Density Index", An IP.com Prior Art Database Technical Disclosure, Authors et. al.: Disclosed Anonymously, IP.com No. IPCOM000200551D, IP.com Electronic Publication: Oct. 19, 2010, pp. 1-5.

IBM, "IBM DB2 11 for z/OS: The database for data and analytics", IBM United States Software Announcement 213-376, dated Oct. 1, 2013, pp. 1-36, IBM is a registered trademark of International Business Machines Corporation, Grace Period Disclosure.

IBM Appendix P, "List of IBM Patents or Patent Applications Treated As Related", Dated Jul. 24, 2017, 2 pages.

| PARTITION NUMBER | RECORDS LOADED | REMAINING RECORDS | REMAINING PARTITIONS | AVERAGE RECORDS PER PARTITION |
|---|---|---|---|---|
| Start |  | 1000 | 10 | 100 |
| 1 | 190 | 810 | 9 | 90 |
| 2 | 110 | 700 | 8 | 88 |
| 3 | 100 | 600 | 7 | 86 |
| 4 | 130 | 470 | 6 | 78 |
| 5 | 90 | 380 | 5 | 76 |
| 6 | 125 | 255 | 4 | 64 |
| 7 | 75 | 180 | 3 | 60 |
| 8 | 60 | 120 | 2 | 60 |
| 9 | 75 | 45 | 1 | 45 |
| 10 | 45 | 0 | 0 | 0 |

FIG. 2A

| PARTITION NUMBER | RECORDS LOADED | REMAINING RECORDS | REMAINING PARTITIONS | AVERAGE RECORDS PER PARTITION | STARTING LIMIT KEY | ENDING LIMIT KEY |
|---|---|---|---|---|---|---|
| Start |  | 1000 | 10 | 100 |  |  |
| 1 | 200 | 800 | 9 | 89 | 1 | 1 |
| 2 | 300 | 500 | 8 | 63 | 2 | 2 |
| 3 | 150 | 350 | 7 | 50 | 3 | 3 |
| 4 | 180 | 170 | 6 | 28 | 4 | 4 |
| 5 | 170 | 0 | 5 | 0 | 5 | 5 |
| 6 | 0 | 0 | 4 | 0 | 6 | 9 |
| 7 | 0 | 0 | 3 | 0 | 10 | 13 |
| 8 | 0 | 0 | 2 | 0 | 14 | 17 |
| 9 | 0 | 0 | 1 | 0 | 18 | 21 |
| 10 | 0 | 0 | 0 | 0 | 22 | 25 |

FIG. 2B ly for a database installation allowing data distribution across two or more divisions with each division across one or more nodes. Relational database management systems (RDBMS) store data in database tables that are conceptually organized into records or rows with multiple columns, but may physically be separated into parts along either row or column boundaries between partitions. As records are added or removed from a partitioned table, the size of the partitions change. Over time, the partitions can become unbalanced with the partitions containing highly skewed distributions of data. Database administrators perform reorganization or rebalancing of database partitions to balance the usage of storage space, improve database system performance, or satisfy various system requirements.

METHOD FOR REBALANCING DATA PARTITIONS

BACKGROUND

The present invention relates generally to the field of database management and more particularly to rebalancing partitioned data in a database management system.

A partitioned database environment is a database installation allowing data distribution across two or more divisions with each division across one or more nodes. Relational database management systems (RDBMS) store data in database tables that are conceptually organized into records or rows with multiple columns, but may physically be separated into parts along either row or column boundaries between partitions. As records are added or removed from a partitioned table, the size of the partitions change. Over time, the partitions can become unbalanced with the partitions containing highly skewed distributions of data. Database administrators perform reorganization or rebalancing of database partitions to balance the usage of storage space, improve database system performance, or satisfy various system requirements.

Database tables are divided into partitions based on a boundary value, distribution key, or limit key which is typically a customer specified field or column within each row of data used to divide multiple rows of data. The starting (lowest) and ending (highest) limit key value defines a range of a partition, but the partition is typically referred to by the upper limit key. Partitioning rules require that all records for a single limit key value reside together within the same partition. The decision to set the range for each partition may be calculated based on the total number of data records to be loaded into the database, based on customer specific requirements, or some combination thereof. Besides range partitioning as shown in the example, other forms of partitioning include list partitioning, hash partitioning, and composite partitioning.

Even though tables are divided up into partitions which may reside on separate computers, the data may be accessed efficiently and conveniently in response to Structured Query Language (SQL) statements, such as SELECT, INSERT, DELETE, and UPDATE. The fact that databases are split across database partitions is transparent to users issuing SQL statements or commands. Because each partition may be on a separate physical machine, the processor on each machine is used by the database manager at each partition to manage the part of the total data in the database residing on that machine. Data partitions allow for parallel processing and faster execution of data requests while the user can send a data request without needing to know the specifics of the partitioning of the database.

SUMMARY

Embodiments of the present invention disclose a computer system for rebalancing partitioned data in a database. A computer initiates a rebalance of a first set of data records included in a plurality of database partitions by unloading the first set of data records. The rebalance of the first set of data records is improved based, at least in part, on one or more characteristics of the plurality of database partitions that are determined during the rebalance of the first set of data records. The computer determines a first grouping, comprising a first sub-set of data records in the first set of data records, with a single limit key value. The computer calculates the average number of records per partition by dividing a total number of data records in the first set of data records by a total number of database partitions in the plurality of database partitions. The computer determines whether a first partition is filled based, at least in part, on a first loaded grouping increasing the number of data records loaded into the first partition, such that the number of data records loaded into the first partition is at least equal to the average number of records per partition. The computer responds to a determination that the first partition is filled by updating the average number of records per partition. The updated average number of records per partition is determined by dividing a number of data records remaining to be loaded by a number of database partitions remaining to be filled. The computer determines a second grouping comprising a sub-set of data records in the first set of data records with a single limit key value. The computer determining a total number of unique limit key values included in the second grouping by:

unloading the first set of data records using one or more of: a) an index scan of a unique index of the plurality of database partitions, b) a table space scan, and c) a sort of the first set of data records by ascending limit key value. The computer counting the total number of unique limit key values using one of: a) a counter using an index key during unloading, b) a hashing algorithm during unloading, and c) a counter during re-reading of the first set of data records subsequent to unloading and sorting by ascending limit key values. The computer calculates the average number of unique limit key values per partition by dividing the total number of unique limit key values in the first set of data records by a total number of database partitions in the plurality of database partitions. The computer determines whether a second partition is filled based, at least in part, on a second loaded grouping increasing the number of unique limit key values loaded into the second partition, such that the number of unique limit key values loaded into the second partition is at least equal to the average number of unique limit key values per partition. The computer responds to a determination that the first partition is filled, the computer updating the average number of unique limit key values per partition, wherein the updated average number of unique limit key values per partition is determined by dividing a number of unique limit key values remaining to be loaded by a number of database partitions remaining to be filled. The computer determines if a first empty partition remains after loading the first set of data records. The computer responds to a determination that a first empty partition remains after loading the first set of data records by performing limit key extrapolation for the first empty partition. The computer defines at least one database partition of the plurality of database partitions by an upper limit key value based on a limit key value of a last loaded data record. The computer determines a range of limit key values for the plurality of database partitions from limit key definitions in a database. The computer determines if the limit key of the last loaded record is greater than a first upper limit key value of the first empty partition. The first upper limit key value of the first empty partition was previously defined by the upper limit key value of a corresponding partition before a rebalance. The computer responds to a determination that the upper limit key value of the last loaded record is greater than the first upper limit key value of the first empty partition by redefining the first upper limit key value of the first empty partition by an extrapolated upper limit key value based, at least in part, on the range of limit key values. The computer calculates a remaining range of limit key values by subtracting a greatest limit key value of a reloaded set of data records from a greatest limit key value in the range of limit key values for the plurality of database partitions. The computer calculates an arithmetic average by dividing the remaining range of limit key values by the number of empty partitions. The arithmetic average is based, at least in part, on a limit key column data type. The limit key column data type is one of: a) a numeric limit key column data type, wherein the arithmetic average is determined by dividing the remaining range of limit key values by the number of empty partitions; b) a date/timestamp limit key column data type, wherein the arithmetic average is determined by converting the remaining range of limit key values from date/timestamp values into a number of days, and then dividing by the number of empty partitions; or c) a character limit key column data type, wherein, the arithmetic average is determined by converting the remaining range of limit key values from character values to floating point values, dividing by the number of empty partitions, and then converting a resulting floating point value to a character value. The computer calculates the first upper limit key value of the first empty partition by adding the calculated arithmetic average to the upper limit key value of the last loaded record. The computer calculates a second upper limit key value of a second empty partition by adding the calculated arithmetic average to the first upper limit key value of the first empty partition. The computer loads a second set of data records into the plurality of database partitions based, at least in part, on the one or more characteristics of the plurality of database partitions. The one or more characteristics are used to direct the rebalancing of the first set of data records and the second set of data records.

BRIEF DESCRIPTION OF THE SEVERAL VIEWS OF THE DRAWINGS

FIG. 2A is an example of adaptive rebalancing of a partitioned database, in accordance with an embodiment of the present invention.

FIG. 2B is an example of limit key extrapolation during rebalancing of a partitioned database, in accordance with an embodiment of the present invention.

DETAILED DESCRIPTION

Figure 1:
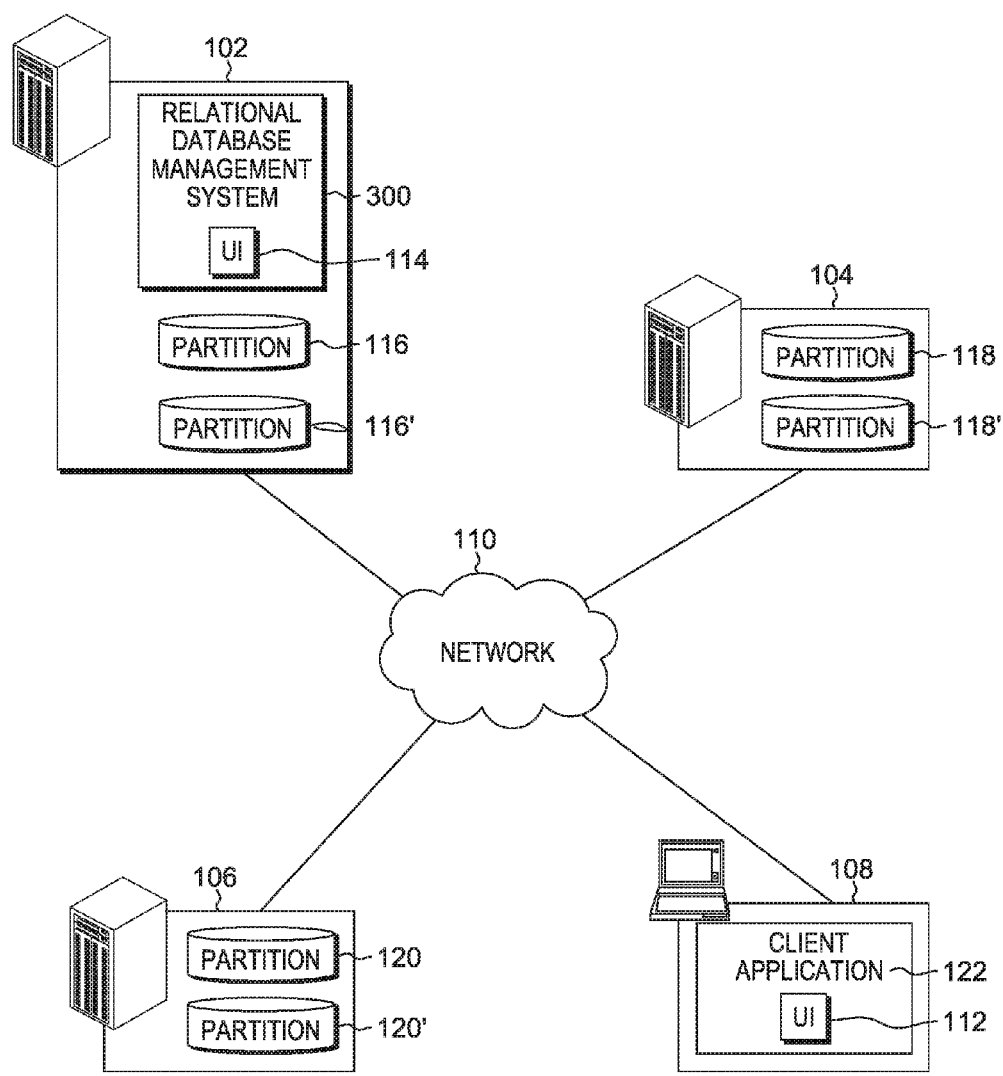
FIG. 1 is a functional block diagram illustrating a distributed data processing environment, in accordance with an embodiment of the present invention.

Embodiments of the present invention recognize that rebalancing of database partitions with heavily skewed data distributions may result in later partitions without records. Database partitions are divided based on a boundary value, or limit key typically defined by a customer specified data field or record column within each row of data. Current relational database management systems (RDBMS) use a rebalance technique that calculates an average number of records per partition which the RDBMS applies to each rebalanced partition. If one partition is loaded with more records than the calculated average number of records per partition due to rules regarding keeping all records for a unique limit key value within a single partition, then the remaining records may not be evenly distributed among the remaining partitions, and empty partitions will result at the end of rebalancing. Embodiments of the present invention provide for adaptive rebalancing of database partitions by recalculating the average number of records per partition after each partition is filled during the rebalance operation with the purpose of ensuring records remain to load into the final partition. Empty partitions may, under certain conditions, produce a rebalance failure which causes a loss of time and resources, but also, having empty partitions defeats the goal of redistributing the records evenly among the partitions.

Embodiments of the present invention recognize that rebalancing of database partitions of highly skewed data distributions using only the average number of records per partition may result in running out of records to distribute to later partitions. Embodiments of the present invention provide for adaptive rebalancing of database partitions which recalculates the average number of unique limit key values per partition after each partition is filled during the rebalance operation with the purpose of ensuring records remain to load into the final partition. In other embodiments, adaptive rebalancing of database partitions may use both the average number of records per partition, and the average number of unique limit key values per partition during the rebalance operation to ensure records remain to load into the final partition.

Current relational database management systems fail during rebalancing operations if empty partitions remain after all records have been reloaded. Embodiments of the present invention recognize that preventing failure of a rebalance operation will reduce human resource hours involved with failure analysis and re-coding, and reduce wasted computing resources on a failed rebalance operation. Empty partitions may occur when rebalancing results are less than optimal due to highly skewed data distributions, or when the number of unique limit key values present in the data is less than the number of partitions to be filled. Embodiments of the present invention provide for extrapolation of limit keys to be used to define empty partitions after all records have been reloaded to prevent failure of a rebalance operation.

Implementation of embodiments of the invention may take a variety of forms, and exemplary implementation details are discussed subsequently with reference to the figures. The illustrated embodiment describes a series of commands that can be expressed as query statements, using SQL as the query language. Specific details disclosed herein are not to be interpreted as limiting, but merely as a representative basis for teaching one skilled in the art to variously employ the methods and structures of the present disclosure. Embodiments of the present invention may apply to all database types, including but not limited to relational, hierarchical, network, and object-oriented databases. Likewise, embodiments of the present invention may apply to other query languages, including but not limited to SQL, QUEL, OQL, and SEQUEL.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computers 102, 104, and 106, and client computer 108, interconnected over network 110. Distributed data processing environment 100 may include additional server computers, client computers, or other devices not shown.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computers 102, 104, and 106, and client computer 108, in accordance with a desired embodiment of the present invention.

Server computers 102, 104, and 106 can each respectively be a server computer, an application server, a laptop computer, a tablet computer, a netbook computer, a personal computer (PC), a desktop computer, a personal digital assistant (PDA), a smart phone, or any programmable electronic device capable of communicating with client computer 108, and the remaining server computers via network 110. In certain embodiments, server computers 102, 104, and 106 can each respectively represent a computer system utilizing clustered computers and components that act as a single pool of seamless resources when accessed through network 110, as is common in data centers and with cloud computing applications. Server computers 102, 104, and 106 may each be a node in a distributed database management environment. In general, server computers 102, 104, and 106 can each respectively be representative of any computing device or a combination of devices with respective access to relational database management system 300, partitions 116, 118, and 120, and partitions 116', 118', and 120', and are respectively capable of executing relational database management system 300. Server computers 102, 104, and 106 may each include internal and external hardware components, as depicted and described in further detail with respect to FIG. 4.

Server computer 102 includes an instance of relational database management system 300 and a connection to database partitions 116, 118, and 120 via network 110. In the depicted environment, relational database management system 300 uses a user interface, such as UI 114, to receive user input, and to output responses to a user, such as a database administrator. In the depicted environment, relational database management system 300 may be a suite of database management software applications that interact with a user via UI 114, other applications such as client application 122, and one or more databases to allow the definition, creation, querying, update, and administration of databases. Relational database management system 300 has the capability to create, fill, and rebalance partitions of a database, such as partitions 116, 118, and 120, within distributed data processing environment 100. Relational database management system 300 performs partition rebalancing by unloading or extracting data from partitions 116, 118, and 120, sorting the extracted data, and reloading the transformed data into partition copies, such as partitions 116', 118', and 120'. Once the partition copies are updated with any intermittent changes, all applications are directed to point to the new partitions 116', 118', and 120'. Relational database management system 300 may perform other tasks such as creating and publishing reports, updating indices or database statistics from the rebalanced database after the partition rebalance task is finished. A database partition rebalance operation performed by relational database management system 300 is described further in FIGS. 3A and 3B.

In other embodiments of the present invention, relational database management system 300, partitions 116, 118, and 120, and partitions 116', 118', and 120', may be on one computer, or more than one computer, and each item itself may be split into a plurality of parts or modules and spread across more than one computer. In any configuration, the following is maintained: relational database management system 300 communicates with partitions 116, 118, and 120, and new partitions 116', 118', and 120'.

Relational database management system 300 enables the addition, update, or deletion of database records within partitions, such as partitions 116, 118, and 120. Partitions may divide database tables by rows called records, or by columns within rows. In the illustrative embodiment of FIG. 1, the database is divided by rows, where each row contains a data field in a column that is designated as a limit key. A limit key may also be referenced to as a partitioning key, boundary key, or distribution key. The limit key may be specified by the database administrator, and is typically based on customer specification for separation of data. The highest value of the limit key within a partition is referred to as the limit key for the partition. For example, the limit key may be a data field representing zip codes. In a database with three partitions, table rows with zip codes of 01000 to 49999 are in partition 116, table rows with zip codes of 50000 to 79999 are in partition 118, and table rows with zip codes of 80000 to 99999 are in partition 120. The limit key (or upper bound) for partition 116 is 49999, for partition 118 is 79999, and for partition 120 is 99999.

Server computer 102 includes an instance of partition 116, and is coupled to server computers 104 and 106 via network 110. Server computer 104 includes an instance of partition 118, and is coupled to server computers 102 and 106 via network 110. Server computer 106 includes an instance of partition 120, and is coupled to server computers 102 and 104 via network 110. In the illustrative embodiment, partition 116 is a first partition, partition 118 is a second partition, and partition 120 is a third partition within a relational database that comprises partitions 116, 118, and 120.

Partitions 116', 118', and 120', are new database partitions located on server computer 102, 104, and 106 respectively. After rebalancing, the records from partitions 116, 118, and 120 are redistributed among the new partitions 116', 118', and 120' to create as even a distribution of the records as possible depending on the nature of the data. The new partitions 116', 118', and 120' will replace the old partitions 116, 118, and 120 in use, and at a later time, the old partitions 116, 118, and 120 will be deleted.

Relational database management system 300 includes a user interface, such as UI 114. UI 114 may utilize a web page application, a command line processor, or any other graphical user interface (GUI). UI 114 includes components used to receive input from a user and transmit the input to relational database management system 300 residing on server computer 102. In an embodiment, UI 114 uses a combination of technologies and devices, such as device drivers, to provide a platform to enable users of server computer 102 to interact with relational database management system 300. In various embodiments, UI 114 receives input using a physical input device, such as a keyboard or mouse, via a device driver that corresponds to the physical input device. In an embodiment of the present invention, relational database management system 300 may receive a request to rebalance a partitioned database from a user via UI 114.

In various embodiments of the present invention, client computer 108 can be a laptop computer, a tablet computer, an application server, a netbook computer, a personal computer (PC), a desktop computer, a personal digital assistant (PDA), a smartphone, or any programmable electronic device capable of communicating with server computers 102, 104, and 106 via network 110. In certain embodiments, client computer 108 can represent a computer system utilizing clustered computers and components that act as a single pool of seamless resources when accessed through network 110, as is common in data centers and with cloud computing applications. In general, client computer 108 can be representative of any computing device or a combination of devices with access to client application 122, and is capable of executing client application 122.

Client computer 108 includes an instance of client application 122, which executes locally on client computer 108 and has the capability to communicate with relational database management system 300 on server computer 102 via network 110. In various embodiments, client application 122 is an associated client application created by a vendor or developer of relational database management system 300 for use in a server-client environment. In the depicted environment, client application 122 uses a user interface, such as UI 112, to receive user input, and to output responses to a user. In the depicted environment, client application 122 is an application enabling authorized users, such as database administrators, to request relational database management system 300 to perform some task, such as partition rebalancing, related to the database composed of partitions 116, 118, and 120 residing respectively on server computers 102, 104, and 106. Client application 122 allows users or applications of client computer 108 to transmit queries or SQL commands to the database, and to retrieve data from the database. The queries are written without the knowledge of which data records are on which of the multiple partitions. In other embodiments of the present invention, client application 122 may reside on the same computer as relational database management system 300.

Client application 122 includes a user interface, such as UI 112. UI 112 may utilize a web page application, a command line processor, or any other graphical user interface (GUI). UI 112 includes components used to receive input from a user and transmit the input to client application 122 residing on client computer 108. In an embodiment, UI 112 uses a combination of technologies and devices, such as device drivers, to provide a platform to enable users of client computer 108 to interact with client application 122. In the various embodiments, UI 112 receives input using a physical input device, such as a keyboard or mouse, via a device driver that corresponds to the physical input device.

In an embodiment of the present invention, client application 122 residing on client computer 108 allows an authorized user, such as a database administrator, to send a request to relational database management system 300 on server computer 102 via network 110 to rebalance the database comprised of partitions 116, 118, and 120. In another embodiment of the present invention, relational database management system 300 may receive the request to rebalance the database from a user of server computer 102 via UI 114. Databases may comprise two or more partitions which may be combined into groups, but, for simplicity, only three partitions are shown. A data set is a collection of the contents from a database. A table space scan, or relational scan, is a method of scanning the data within a database without the use of indexes. Relational database management system 300 performs a partition rebalance by unloading data records into a data set via a table space scan of partitions 116, 118, and 120, sorting the extracted data in ascending order of the limit key, and reloading the sorted data into new partitions 116', 118', and 120' using adaptive rebalancing and if necessary, extrapolated limit keys.

After completion of the rebalance, applications accessing partitions 116, 118, and 120 are shut down, the new partitions are updated with any intermittent changes since the data extraction, database indices are recreated based on the new partitions, and all data applications are directed to point to new partitions 116', 118', and 120'. At some point determined by the database administrator or by relational database management system 300, the old partitions are removed.

In an embodiment of the present invention, relational database management system 300 provides for adaptive rebalancing of database partitions by recalculating the average number of records per partition during the rebalance operation for the purpose of ensuring records remain to load into the final partition. An example of adaptive rebalancing using the average number of records per partition is described further in FIG. 2A.

In an embodiment of the present invention, relational database management system 300 provides for extrapolation of limit keys for remaining empty partitions after all records have been loaded to prevent failure of a rebalance operation. An example of limit key extrapolation during adaptive rebalancing is described further in FIG. 2B.

In an embodiment of the present invention, relational database management system 300 provides for adaptive rebalancing of database partitions by recalculating the average number of records per partition during the rebalance operation, and provides for extrapolation of limit keys for remaining empty partitions after all records have been loaded. The operational flow of adaptive rebalancing by recalculating the average number of records per partition and of limit key extrapolation is described further in FIG. 3A.

In an alternate embodiment, relational database management system 300 provides for adaptive rebalancing of database partitions by recalculating the average number of unique limit keys per partition and by recalculating the average number of records per partition during the rebalance operation, and also provides for extrapolation of limit keys for remaining empty partitions after all records have been loaded. The operational flow of adaptive rebalancing using the average number of unique limit keys per partition and average number of records per partition, and of extrapolation of limit keys is described further in FIG. 3B.

FIG. 2A is an example of adaptive rebalancing of a partitioned database, in accordance with an embodiment of the present invention. In the illustrative embodiment, a relational database having 10 partitions and 1000 total data records needs rebalancing. Before reloading, the data records are sorted by limit key in ascending order.

At the start of rebalancing the target average number of records per partition is calculated to be 1000/10=100 records. In the calculation, the number of records may be rounded up. While loading partition 1, a total of 190 records are loaded into the partition starting with the records with the lowest limit key value first. If the total number of records with the first limit key is less than 100, then the records for the next limit key are loaded into partition 1 as well. Partition rules define that the records for a single unique limit key are loaded within the same partition.

Since more than 100 records are loaded into partition 1, if the initial target of 100 records per partition is used throughout partitioning, then there will be too few records remaining to fill the final partitions. In an embodiment of the present invention, adaptive rebalancing provides for recalculating the target average number of records per partition after each partition is filled. After partition 1 is filled, 810 records remain for filling 9 partitions, such that the new average number of records per partition is calculated to be 810/9=90 records per partition.

Partition 2 is filled with 110 records, which is above the target of 90, and the average number of records per partition is recalculated to be 700/8=88 records per partition. Partition 3 is filled with 100 records, which is above the target of 88, and the average number of records per partition is recalculated to be 600/7=86 records per partition. Partition 4 is filled with 130 records, which is above the target of 86, and the average number of records per partition is recalculated to be 470/6=78 records per partition.

This continues through partitions 5 through 10, recalculating the average number of records per partition each time. Note by partition 7, the average is down to 60 records per partition, much less than the initial starting point of 100 records per partition. The final partition, partition 10, receives 45 records during reload which would not have happened without the adaptive rebalancing method. The adaptive rebalancing method using the recalculation of the average number of records per partition allows for rebalancing of partitions with a more even distribution of data records.

FIG. 2B is an example of limit key extrapolation during rebalancing of a partitioned database, in accordance with an embodiment of the present invention. In the illustrative embodiment, a relational database having 10 partitions and 1000 total data records needs rebalancing. Before reloading, the data records are sorted by limit key in ascending order.

At the start of rebalancing the target average number of records per partition is calculated as the total number of records divided by the total number of partitions, for example, 1000/10=100 records. While loading partition 1, a total of 200 records are loaded into the partition starting with the records with the lowest limit key first. Partition rules define that all records for a single limit key are to be loaded within the same partition. In an embodiment of the present invention, adaptive rebalancing provides for recalculating the target average number of records per partition after each partition is filled. All 200 records loaded into partition 1 are from limit key 1, and the average number of records per partition is recalculated as the number of remaining records to be loaded divided by the remaining empty partitions, for example, 800/9=89 records per partition.

Partition 2 is filled with 300 records from limit key 2, which is above the target of 89, and the average number of records per partition is recalculated to be 500/8=63 records per partition. Partition 3 is filled with 150 records from limit key 3, which is above the target of 63, and the average number of records per partition is recalculated to be 350/7=50 records per partition. Partition 4 is filled with 180 records from limit key 4, which is above the target of 50, and the average number of records per partition is recalculated to be 170/6=28 records per partition. Partition 5 is filled with the remaining 170 records which are all from limit key 5. There is no need to recalculate the average records per partition since no records remain.

Up to this point, the method of adaptive rebalancing has provided for the number of records to be distributed as evenly across all partitions as possible given the heavily skewed distribution of existing limit key values in the data records. However, the five empty remaining partitions causes an unrecoverable error in the rebalance operation, and the time to perform the rebalance operation to this point would be wasted. The rebalance error happens when the last loaded record has a limit key value higher than the previously defined upper limit key for the first empty partition. Without limit key extrapolation, relational database management system 300 cannot define upper limit keys for each empty partition, because relational database management system 300 may only use the limit keys actually present in the reloaded data set. Embodiments of the present invention provide relational database management system 300 with the range of values of the limit keys as defined in the system catalog, and enable relational database management system 300 to define upper limit keys for empty partitions with values which do not exist in the reloaded data set.

Embodiments of the present invention provide for a way to extrapolate limit key values for the remaining empty partitions to prevent the rebalance from failing. Limit key extrapolation provides a way to fill in sensible limit key values for the empty data partitions and still enforce the rule of ascending limit key values. If the limit key value of the last loaded record is higher than the previously defined limit key values (before rebalancing) of the remaining empty partitions, then the remaining partitions require limit key extrapolation. The specific method of limit key extrapolation depends on the limit key column data type, which can be, for example, numeric, date/timestamp, or character.

In the example of FIG. 2B, the data type is numeric, such as a small integer, and is defined at table creation to have a range of 1 to 25. Embodiments of the present invention, provide for relational database management system 300 to have access to the range information for the limit key prior to the reload portion of the rebalance operation, either during the unload or sort phase. To extrapolate limit keys for the remaining partitions, relational database management system 300 calculates the arithmetic average number of remaining limit keys per remaining partitions. The arithmetic average is calculated to be (20 remaining limit keys)/(5 remaining partitions)=(4 limit keys per partition). Therefore, each remaining partition should be assigned 4 limit keys. For example, adding the average number of remaining limit keys to the last used limit key, 4+5=9, means that partition 6 is defined to cover limit keys 6 through 9. Next, calculating 4+9=13, means that partition 7 covers limit keys 10 through 13. Calculating 4+13=17, means that partition 8 covers limit keys 14 through 17. In the same way, partition 9 covers limit keys 18 through 21, and partition 10 covers limit keys 22 through 25. In this way, each empty partition is defined with limit key values so that future data corresponding to limit keys from 6 to 25 has somewhere to go in the partitions of the database.

If the limit key of the last loaded record is lower than the previously defined limit key values (before rebalancing) of the remaining empty partitions, then the remaining partitions may keep the previously defined limit keys, and nothing else needs to be done.

The use of limit key extrapolation allows the rebalance to finish without error. If the customer or database administrator wishes to have different limit key values applied to the empty partitions, then relational database management system 300 allows for the limit key values of each partition to be reviewed and altered manually. The manual updates may be through commands, such as SQL commands, sent by either client application 122 on client computer 108, or by relational database management system 300 on server computer 102.

Figure 3A:
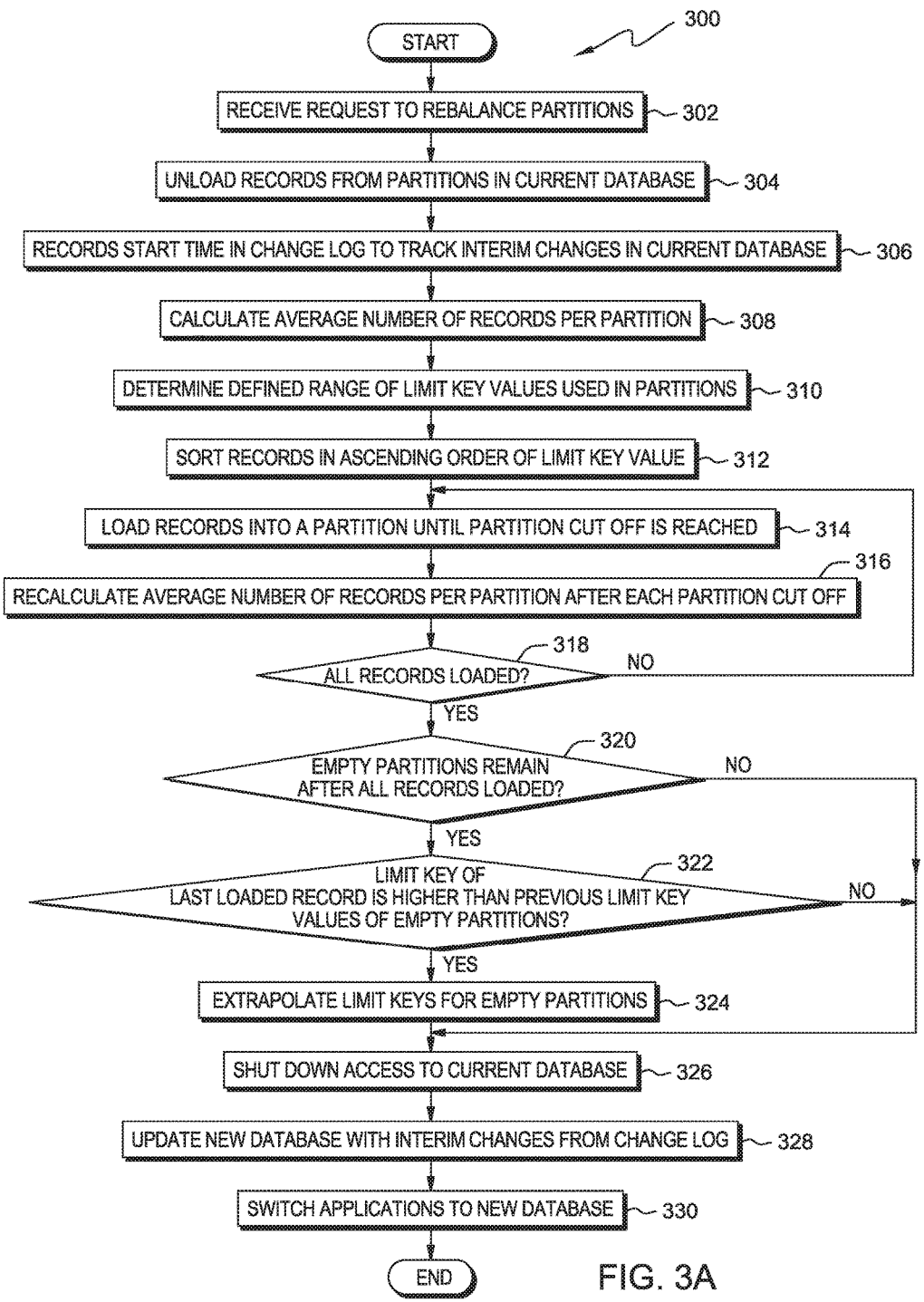
FIG. 3A is a flowchart depicting the operational steps of a relational database management system for rebalancing a partitioned database using adaptive rebalancing by the average number of records per partition and using limit key extrapolation, in accordance with an embodiment of the present invention.

FIG. 3A is a flowchart depicting the operational steps of a relational database management system for rebalancing a partitioned database using adaptive rebalancing by the average number of records per partition and using limit key extrapolation, in accordance with an embodiment of the present invention.

Initially, relational database management system 300 receives credentials from a user of server computer 102 or client computer 108 for validation. Relational database management system 300 validates that the user has the authority to access the database and the authority to request performance of administrative tasks. Responsive to determining that the user has the proper authority, relational database management system 300 performs any requested tasks. If the user does not have the proper authority, then no access will be granted, and no tasks will be performed. Relational database management system 300 provides the database connections, and enables users of client application 122 on client computer 108, or relational database management system 300 on server computer 102 to issue commands for performing tasks on the database.

Relational database management system 300 on server computer 102 receives a request to rebalance partitions 116, 118, and 120 residing on server computers 102, 104, and 106, respectively (step 302). The request may come from a user, such as a database administrator, via client application 122 on client computer 108 via network 110, or via relational database management system 300 on server computer 102. A rebalance operation may be on all partitions of a database, on a group of partitions of a database, or some selected set of partitions within a database, as defined in the request.

Relational database management system 300 unloads all records from partitions in the current database (step 304). In the illustrative embodiment, all records from partitions 116, 118, and 120 are unloaded, such as through a table space scan. Unload means a copy of the records are stored in a memory or other storage location accessible to relational database management system 300, other than partitions 116, 118, and 120.

Relational database management system 300 records start time in change log to track interim changes in current database (step 306). The log is used to record the date and time of all changes to the database including, but not limited to, adding, updating, or deleting rows or records in the database. The start time may be recorded in the change log, or in another data store connected to relational database management system 300 for reference at the end of the rebalance process in step 328.

Relational database management system 300 calculates the average number of records per partition (step 308) to be used as an initial target during loading of new partitions 116', 118', and 120'. At the start of rebalancing, the average number of records per partition is calculated as the total number of records to be loaded divided by the total number of partitions to be loaded. This value may be rounded up as necessary.

Relational database management system 300 determines the defined range of the limit key values used in partitions 116, 118, and 120 (step 310). The limit key values actually used in the current partitions may only be a sub-set of the values available. When the database table is created, the range of the limit key value may be set by a customer specification, and entered by the database administrator. This range may be stored in some part of the database, such as the system catalog, or in a separate data store accessible to relational database management system 300 for use later in step 324.

Relational database management system 300 sorts the unloaded records in ascending order of limit key value (step 312). This sort may be part of the unload process or may be done at any time prior to the reload operation. In other embodiments, the records may not be physically sorted, and instead the loading process utilizes an index of the records that enables loading in ascending order of limit key into the new partitions. In the case of character data, the records may be sorted in alphabetical order.

Relational database management system 300 loads records into a partition until partition cut off is reached (step 314). When loading a new partition, records are loaded starting with the records with the lowest limit key value first, and all records for a single limit key value are loaded within the same partition. By following that rule, some partitions are filled with more records than the average number of records per partition due to the amount of data associated with the limit key. After the records for a limit key are loaded into a partition, if the total number of records loaded in the partition is less than the average number of records per partition as calculated in step 308, then the records for the next limit key are loaded into the partition. Records for each subsequent limit key are loaded into the partition until the total number of records loaded into the partition at least equals or exceeds the average number of records per partition. At this point, the partition is filled, partition cut off is reached, and relational database management system 300 stops loading into the current partition, and moves to the next partition.

Relational database management system 300 recalculates the average number of records per partition after each partition cut off (step 316). When more records are loaded into a partition than the average number of records per partition, and if the initial target of records per partition calculated in step 308 were used throughout partitioning, then there would be too few records remaining to fill the final partitions. In an embodiment of the present invention, adaptive rebalancing provides for recalculating the average number of records per partition after each partition is filled. Responsive to determining a partition is filled, relational database management system 300 recalculates the new average number of records per partition by taking the number of remaining records to be loaded divided by the remaining empty partitions. Using the updated average as the target number of records for filling the next partition, adaptive rebalancing helps to smooth out an un-even data distribution across all partitions, and helps increase the likelihood of having at least one grouping of data records with one limit key value for loading into the last partition.

Relational database management system 300 determines if all records have been loaded (decision block 318). If relational database management system 300 determines all records have been loaded (yes branch, decision block 318), then relational database management system 300 determines if empty partitions remain after all records have been loaded (decision block 320). If relational database management system 300 determines all records have not been loaded (no branch, decision block 318), then relational database management system 300 loads records into a partition until partition cut off is reached (step 314). Relational database management system 300 continues filling the next partition until partition cut off is reached (step 314), and recalculating the average number of records per partition after each partition cut off (step 316) until all data has been loaded.

Partitions are loaded in sequence, such as partition 116', then partition 118', and finally partition 120'.

Relational database management system 300 determines if empty partitions remain after all records have been loaded (decision block 320). If relational database management system 300 determines empty partitions do not remain after all records have been loaded (no branch, decision block 320), then relational database management system 300 shuts down access to the current database (step 326). If no empty partitions remain, then limit key extrapolation is not required, and relational database management system 300 begins preparations for the switchover to the new partitions.

If relational database management system 300 determines empty partitions do remain after all records have been loaded (yes branch, decision block 320), then relational database management system 300 determines if the limit key of the last loaded record is higher than the previous limit key values of empty partitions (decision block 322). If relational database management system 300 determines that the limit key of the last loaded record is not higher than the previous limit key values of empty partitions (no branch, decision block 322), then relational database management system 300 shuts down access to the current database (step 326). If the limit key of the last loaded record is less than the previously defined limit key values bounding the empty partitions, then the empty partitions may keep the previous limit key values they had before the rebalancing. As long as limit key values are maintained in ascending order, no limit key extrapolation is needed, and relational database management system 300 begins preparations for the switchover to the new partitions.

If relational database management system 300 determines that the limit key of the last loaded record is higher than the previous limit key values of empty partitions (yes branch, decision block 322), then relational database management system 300 extrapolates limit keys for empty partitions (step 324). Embodiments of the present invention provide for a method allowing relational database management system 300 to extrapolate limit key values for the remaining empty partitions to prevent the rebalance operation from failing. Relational database management system 300 performs limit key extrapolation to fill in limit key values for the empty data partitions and enforces the rule of ascending limit key values. Limits keys are defined at table creation to have a specific range which was determined in step 310. In embodiments of the present invention, relational database management system 300 has access to the range information for the limit key prior to the reload portion of the rebalance operation.

To extrapolate limit keys of numeric data types for the remaining empty partitions, relational database management system 300 calculates an arithmetic average for the remaining partitions requiring limit key values by dividing the remaining range of limit key values by a number of empty partitions. Relational database management system 300 calculates the remaining range of limit key values by subtracting the greatest limit key value of the reloaded set of data records from the greatest limit key value in the range of limit key values as defined for partitions 116, 118, and 120. In various embodiments of the present invention, when limit key definitions are comprised of multiple columns or fields in a record, only the first or leading column of the limit key definition is used in limit key extrapolation.

Relational database management system 300 adds the arithmetic average to the last used limit key to define the upper limit key of the first empty partition. A partition is defined, at least in part, by the upper limit key. For example, when limit keys are whole numbers, and the last limit key loaded into partition 7 was 10, then empty partition 8 would start at 10+1=11, and end at 10+5=15, if the arithmetic average is 5. Relational database management system 300 determines the upper limit key range for the remaining empty partitions by adding the arithmetic average to the last limit key of the previous partition.

The method of limit key extrapolation is dependent on the limit key column data type, for example, numeric, date/timestamp, or character. Numeric data types for limit keys are including, but not limited to, integer, small integer, decimal, floating point, bigint, and decfloat. Relational database management system 300 determines the arithmetic average by dividing the remaining range of limit key values by the number of empty partitions.

To extrapolate limit keys of date/timestamp data types for the remaining empty partitions, relational database management system 300 calculates a mid-range date/timestamp value using calculation by days. Relational database management system 300 determines the arithmetic average by converting the remaining range of limit key values from date/timestamp values into a number of days, and then dividing by the number of empty partitions. Relational database management system 300 determines the upper limit key range for the remaining empty partitions by adding the arithmetic average in number of days to the last limit key of the previous partition.

To extrapolate limit keys of character type for the remaining empty partitions, relational database management system 300 converts the character to a floating point value, calculates the arithmetic average by dividing by the number of empty partitions, and reconverts the floating point value to a character data type value. Relational database management system 300 determines the upper limit key range for the remaining empty partitions by adding the arithmetic average as a floating point number to the last limit key of the previous partition as a floating point number, and then converting the resultant floating point number into a character.

Relational database management system 300 shuts down access to the current database (step 326) comprised of partitions 116, 118, and 120. Relational database management system 300 stops all access to partitions 116, 118, and 120 so that a switch to new partitions 116', 118', and 120', may be made without losing data transactions during the switchover.

Relational database management system 300 updates the new database with any interim changes from the change log (step 328). In step 306, the start time of the rebalance operation was recorded. Any changes to the database partitions 116, 118, and 120 that happened between the time the data records were unloaded and the shutdown of applications accessing the current database, will be performed on the records that reside in new partitions 116', 118', and 120'. Relational database management system 300 also performs any updates to indices of the database in relation to the changes coming from the rebalance operation.

If the customer or database administrator wishes to have different limit key values applied to the empty partitions than were created during limit key extrapolation, then relational database management system 300 allows for the limit key values of each partition to be reviewed and altered manually at this time. The manual updates may be through commands sent by either client application 122 on client computer 108, or by relational database management system 300 on server computer 102.

Relational database management system 300 switches applications to the new database (step 330) comprised of new partitions 116', 118', and 120'. All applications and users are switched to the new database, such that changes will now be performed on new partitions 116', 118', and 120'. At some point, relational database management system 300 will delete partitions 116, 118, and 120 from the database. This may be specified by predefined cleaning procedures, or by the database administrator as needed.

Figure 3B:
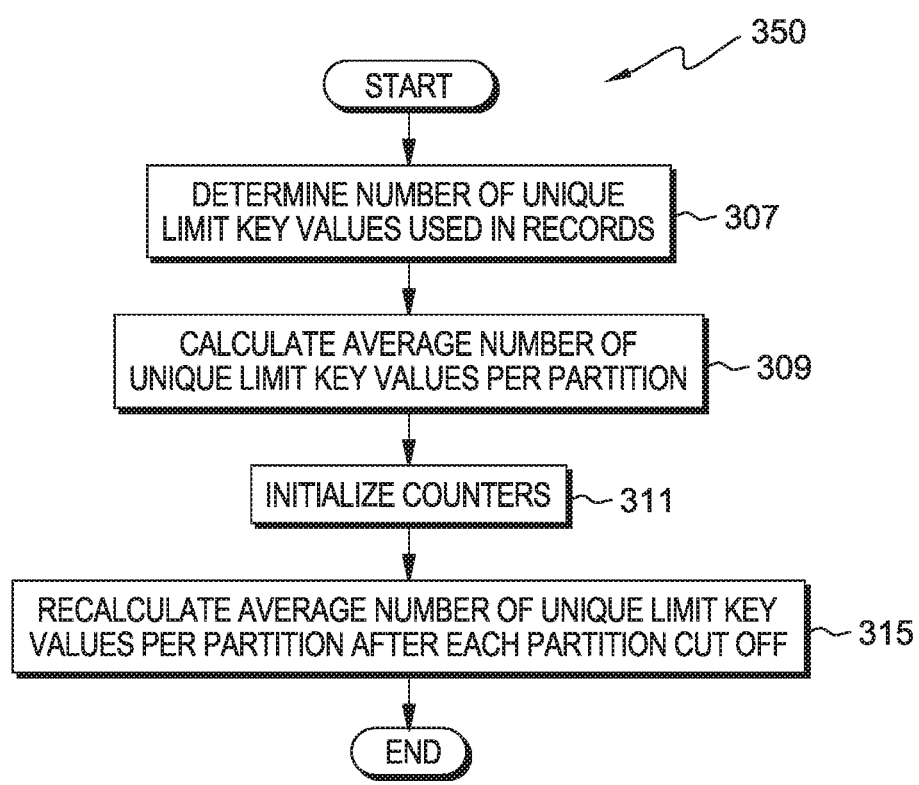
FIG. 3B is a flowchart depicting additional operational steps of a relational database management system for rebalancing a partitioned database using adaptive rebalancing by the average number of unique limit key values per partition and using limit key extrapolation, in accordance with an alternate embodiment of the present invention.

FIG. 3B is a flowchart depicting additional operational steps of a relational database management system for rebalancing a partitioned database using adaptive rebalancing by the average number of unique limit key values per partition and using limit key extrapolation, in accordance with an alternate embodiment of the present invention. In the alternate embodiment, additional odd-numbered steps of flow 350 are added to flow 300 of FIG. 3A, and fit in numerical order between the steps of FIG. 3A. These steps provide for adaptive rebalancing which uses both recalculation of the average number of records per partition, and recalculation of the average number of unique limit key values per partition.

Steps 302, 304, and 306 are performed as described above in FIG. 3A.

In a first embodiment of the present invention, relational database management system 300 determines the number of unique limit key values used in records from partitions 116, 118, and 120 (step 307). Relational database management system 300 may use various methods to determine the number of unique limit key values actually existing in partitions 116, 118, and 120. In one embodiment of the present invention, if there is a unique index on the database partitions that is a super-set of the limit key columns, then unloading the data records via an index scan of that index, and tracking the number of unique limit key values from the index key as data records are unloaded in sequence without sorting is possible by relational database management system 300. This method provides an exact count of the number of unique limit key values, and removes the sort requirement after unload at step 312; however, the method can be resource expensive depending on the disorganization of the index, additional I/O is required, and the method may be non-universal depending on the DDL definitions for the database.

In a second embodiment of the present invention, as relational database management system 300 unloads the data records via table space scan, relational database management system 300 may perform a hashing algorithm on each extracted limit key value to come up with a rough estimate of the number of unique limit key values. This method may be programmed into the unload process, but the obtained number is only an estimate, and the hashing program is CPU intensive.

In a third embodiment of the present invention, as relational database management system 300 sorts the data records in step 312 by limit key value, and as the records are returned from sort, relational database management system 300 may retrieve and compare the limit key values for each record to keep count, and cache the retrieved records into a storage location, such as a basic sequential access method (BSAM) data set or an in-memory buffer. After all records are pre-scanned, relational database management system 300 rereads the records from the start to perform data reloading. This method provides an exact count of the number of unique limit key values, but costs performance overhead in caching and re-reading of the data records.

Step 308 is performed as described above in FIG. 3A.

Relational database management system 300 calculates an average number of unique limit key values per partition (step 309). Filling partitions based on the average number of unique limit key values per partition may be used to ensure that partitions do not exhaust all the unique limit key values before filling the final partition.

Step 310 is performed as described above in FIG. 3A.

Relational database management system 300 initializes counters (step 311). Relational database management system 300 creates and initializes a counter for the number of unique limit key values remaining, and a counter for the number of unique limit key values used in a partition. To aid in recalculating the number of unique limit key values per partition, a counter is needed to keep track of how many unique limit key values have been used in partitions, and how many remain for the remaining partitions. To aid in determining when to cut off loading data to a partition, a counter is needed to keep track of the number of unique limit key values used in a partition. The partition counter is reset prior to the start of loading each new partition.

Step 312 is performed as described above in FIG. 3A.

Relational database management system 300 loads records into a partition until partition cut off is reached (step 314). When loading a new partition, records are loaded starting with the records with the lowest limit key first, and all records for a single limit key are loaded within the same partition. By following that rule, some partitions are filled with more records than the average number of records per partition due to the nature of the data. Records are loaded into partitions based on two limits: (1) the average number of records per partition, and (2) the average number of unique limit key values per partition. After the records for a limit key are loaded into a partition, if the total number of records loaded in the partition is less than the average number of records per partition as calculated in step 308, and if the total number of unique limit key values loaded into the partition is less than the average number of unique limit key values per partition, then the records for the next limit key are loaded into the partition. Records for each subsequent limit key are loaded into the partition until either the total number of records loaded in the partition equals or exceeds the average number of records per partition, or until the total number of unique limit key values loaded into the partition equals the average number of unique limit key values per partition. At this point, partition cut off is reached, and relational database management system 300 stops loading into the current partition. Relational database management system 300 resets the counter for the number of unique limit key values used in a partition.

Relational database management system 300 recalculates the average number of unique limit key values per partition after each partition cut off (step 315). In an embodiment of the present invention, adaptive rebalancing provides for recalculating the average number of unique limit key values per partition after each partition is filled. Relational database management system 300 recalculates the average number of unique limit key values per partition by taking the number of remaining unique limit key values to be loaded (from the counter) divided by the number of remaining empty partitions. By using this new average number of unique limit key values per partition, adaptive rebalancing spreads the data distribution more evenly across all partitions. The number of remaining empty partitions is the same as the remaining number of database partitions to be filled.

In an alternate embodiment, relational database management system 300 uses the initial value for the number of unique limit keys throughout the rebalancing, and does not recalculate this value. In that case, the counter for the number of unique limit key values remaining is not needed.

Step 316 is performed as described above in FIG. 3A.

Relational database management system 300 determines if all records have been loaded (decision block 318). If relational database management system 300 determines all records have been loaded (yes branch, decision block 318), then relational database management system 300 determines if empty partitions remain after all records have been loaded (decision block 320). If relational database management system 300 determines all records have not been loaded (no branch, decision block 318), then relational database management system 300 loads records into a partition until partition cut off is reached (step 314). Relational database management system 300 continues loading records into a partition until partition cut off is reached (step 314), recalculating the average number of unique limit key values per partition (step 315), and recalculating the average number of records per partition after each partition cut off (step 316) until all data has been loaded.

Step 320 is performed as described above in FIG. 3A. Empty partitions may result when the number of unique limit key values is less than the number of partitions being reorganized.

Steps 322, 324, 326, 328, and 330 are performed as described above in FIG. 3A.

Alternate embodiments may exist that use one or more of the following: (1) method of adaptive rebalancing using recalculating the average number of records per partition after each filled partition, (2) the method of adaptive rebalancing using recalculating the average number of unique limit key values per partition, and (3) the method of limit key extrapolation for empty partitions.

Figure 4:
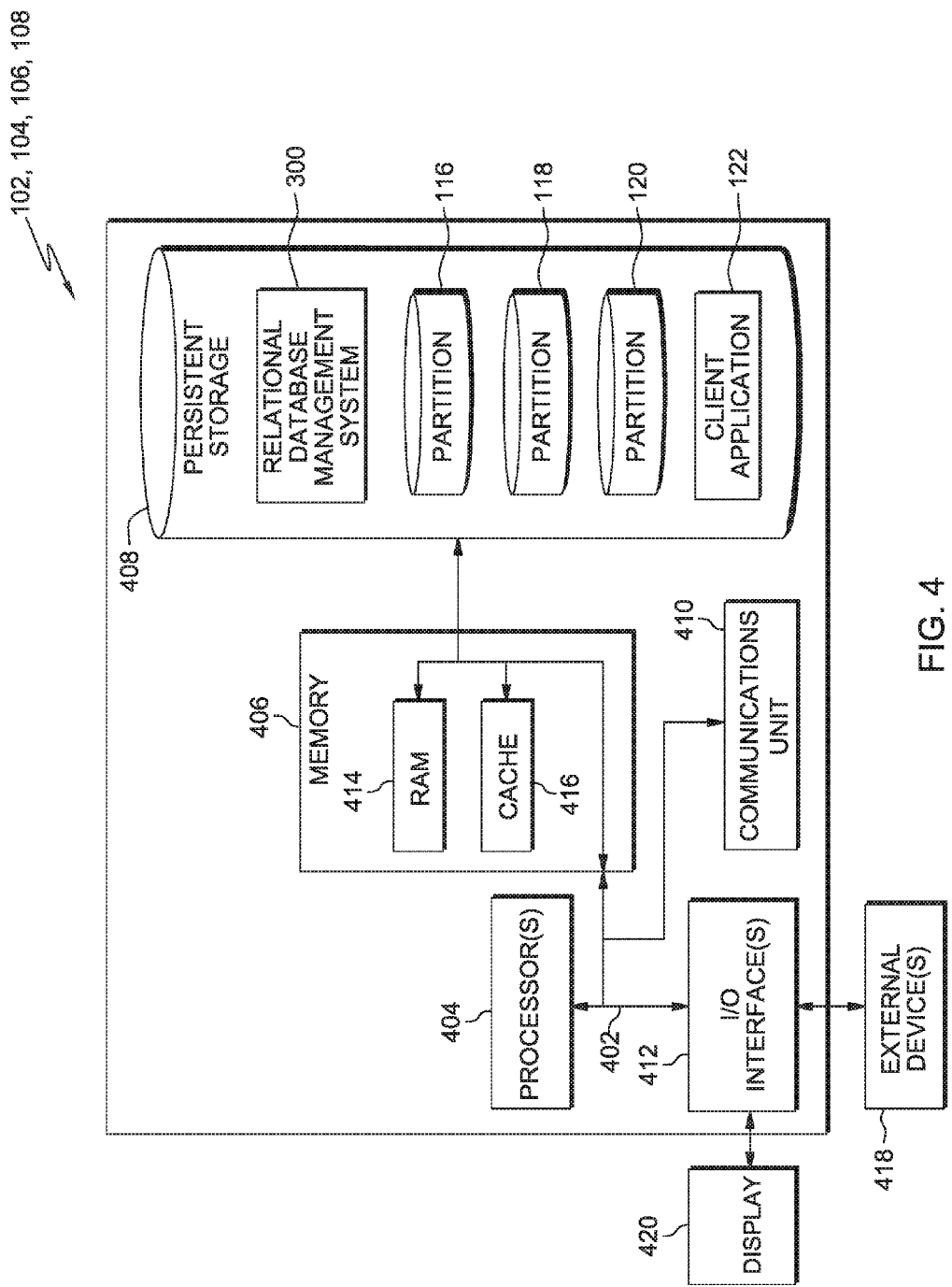
FIG. 4 depicts a block diagram of components of an exemplary computer system for implementing embodiments of the present invention.

FIG. 4 depicts a block diagram of respective components of server computers 102, 104, and 106, and client computer 108, in accordance with an illustrative embodiment of the present invention. FIG. 4 provides only an illustration of one implementation and does not imply any limitations with regard to the environments in which different embodiments may be implemented. Many modifications to the depicted environment may be made.

Server computers 102, 104, and 106, and client computer 108 each include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Relational database management system 300, partitions 116, 118, and 120, and client application 122 are stored in respective persistent storage 408 for execution and/or access by one or more of the further respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computers 102, 104, and 106, and client computer 108. In these examples, communications unit 410 includes one or more network interface cards. Communications unit 410 may provide communications through the use of either or both physical and wireless communications links. Relational database management system 300, partitions 116, 118, and 120, and client application 122 may be downloaded to respective persistent storage 408 through communications unit 410.

I/O interface(s) 412 allows for input and output of data with other devices that may be connected to server computers 102, 104, and 106, and client computer 108. For example, I/O interface 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., relational database management system 300, partitions 116, 118, and 120, and client application 122, can be stored on such portable computer readable storage media and can be loaded onto respective persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A computer system for rebalancing partitioned data in a database, the computer system comprising:
   one or more computer processors;
   one or more computer readable storage medium;
   program instructions stored on the computer readable storage medium for execution by at least one of the one or more processors, the program instructions comprising:
      program instructions to initiate a rebalance of a first set of data records included in a plurality of database partitions by unloading the first set of data records, wherein the rebalance of the first set of data records is improved based, at least in part, on one or more characteristics of the plurality of database partitions that are determined during the rebalance of the first set of data records;
      program instructions to determine a first grouping, comprising a first sub-set of data records in the first set of data records, with a single limit key value;

program instructions to calculate the average number of records per partition by dividing a total number of data records in the first set of data records by a total number of database partitions in the plurality of database partitions;

program instructions to determine a first partition is filled based, at least in part, on a first loaded grouping increasing the number of data records loaded into the first partition, such that the number of data records loaded into the first partition is at least equal to the average number of records per partition;

program instructions to respond to a determination that the first partition is filled by updating the average number of records per partition, wherein the updated average number of records per partition is determined by dividing a number of data records remaining to be loaded by a number of database partitions remaining to be filled;

program instructions to determine a second grouping comprising a sub-set of data records in the first set of data records with a second single limit key value;

program instructions to determine a total number of unique limit key values included in the second grouping by:

unloading the first set of data records using one or more of: a) an index scan of a unique index of the plurality of database partitions, b) a table space scan, and c) a sort of the first set of data records by ascending limit key value;

counting the total number of unique limit key values using one of: a) a counter using an index key during unloading, b) a hashing algorithm during unloading, and c) a counter during re-reading of the first set of data records subsequent to unloading and sorting by ascending limit key values;

calculating the average number of unique limit key values per partition by dividing the total number of unique limit key values in the first set of data records by a total number of database partitions in the plurality of database partitions;

program instructions to determine a second partition is filled based, at least in part, on a second loaded grouping increasing the number of unique limit key values loaded into the second partition, such that the number of unique limit key values loaded into the second partition is at least equal to the average number of unique limit key values per partition;

program instructions to respond to a determination that the second partition is filled by updating the average number of unique limit key values per partition, wherein the updated average number of unique limit key values per partition is determined by dividing a number of unique limit key values remaining to be loaded by a number of database partitions remaining to be filled;

program instructions to determine if a first empty partition remains after loading the first set of data records;

program instructions to respond to a determination that a first empty partition remains after loading the first set of data records by performing limit key extrapolation for the first empty partition by:

defining at least one database partition of the plurality of database partitions by an upper limit key value based on a limit key value of a last loaded data record;

determining a range of limit key values for the plurality of database partitions from limit key definitions in a database;

determining if the limit key of the last loaded record is greater than a first upper limit key value of the first empty partition, wherein the first upper limit key value of the first empty partition was previously defined by the upper limit key value of a corresponding partition before a rebalance;

responding to a determination that the upper limit key value of the last loaded record is greater than the first upper limit key value of the first empty partition by redefining the first upper limit key value of the first empty partition by an extrapolated upper limit key value based, at least in part, on the range of limit key values;

calculating a remaining range of limit key values by subtracting a greatest limit key value of a reloaded set of data records from a greatest limit key value in the range of limit key values for the plurality of database partitions;

calculating an arithmetic average by dividing the remaining range of limit key values by the number of empty partitions, wherein the arithmetic average is based, at least in part, on a limit key column data type, and wherein the limit key column data type is one of: a) a numeric limit key column data type, wherein the arithmetic average is determined by dividing the remaining range of limit key values by the number of empty partitions, b) a date/timestamp limit key column data type, wherein the arithmetic average is determined by converting the remaining range of limit key values from date/timestamp values into a number of days, and then dividing by the number of empty partitions, or c) a character limit key column data type, wherein, the arithmetic average is determined by converting the remaining range of limit key values from character values to floating point values, dividing by the number of empty partitions, and then converting a resulting floating point value to a character value;

calculating the first upper limit key value of the first empty partition by adding the calculated arithmetic average to the upper limit key value of the last loaded record;

calculating a second upper limit key value of a second empty partition by adding the calculated arithmetic average to the first upper limit key value of the first empty partition; and program instructions to load a second set of data records into the plurality of database partitions based, at least in part, on the one or more characteristics of the plurality of database partitions, wherein the one or more characteristics are used to direct the rebalancing of the first set of data records and the second set of data records.

* * * * *